H. N. GILBERT.
SANITARY WASHING APPARATUS.
APPLICATION FILED DEC. 19, 1916.

1,239,176.

Patented Sept. 4, 1917.

Inventor
Harvey N. Gilbert

Attorney

UNITED STATES PATENT OFFICE.

HARVEY N. GILBERT, OF NIAGARA FALLS, NEW YORK.

SANITARY WASHING APPARATUS.

1,239,176.          Specification of Letters Patent.      Patented Sept. 4, 1917.

Application filed December 19, 1916. Serial No. 137,750.

*To all whom it may concern:*

Be it known that I, HARVEY N. GILBERT, a citizen of the United States, residing at Niagara Falls, in the county of Niagara and State of New York, have invented a certain new and useful Improvement in Sanitary Washing Apparatus, of which the following is a full, clear, and exact description.

The object of this invention is to provide a convenient means for cleaning infants' diapers of fecal matter, in a sanitary manner and expeditiously, and with little if any necessity for hand contact.

The invention consists of a pan or other support for the diaper, adapted to be arranged in a water-closet bowl, a pail, or other receptacle, and a scrubber adapted to be connected with a water supply and to be moved over the soiled garment so supported and both wash and scrape the fecal matter therefrom, as I will proceed now to explain and finally claim.

Figure 1:
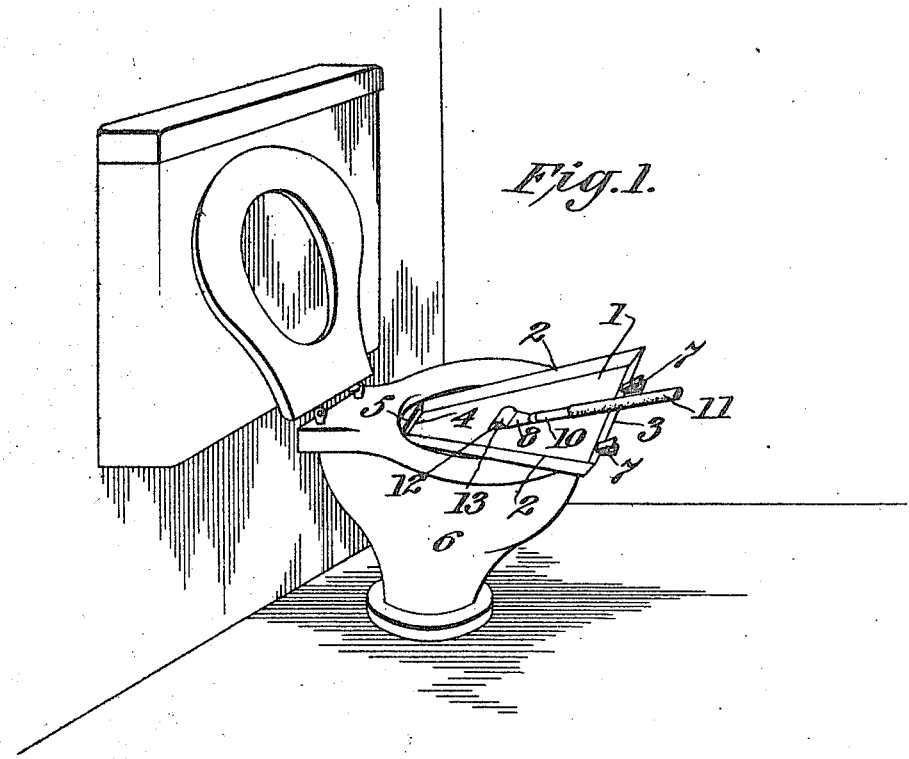
Figure 3:
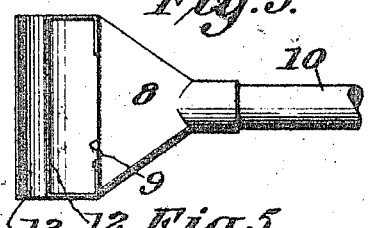
Figure 2:
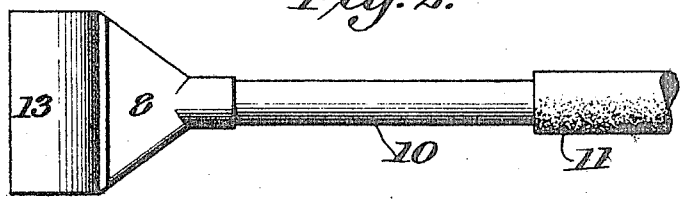
Figure 5:
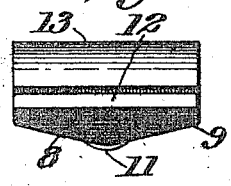
Figure 4:
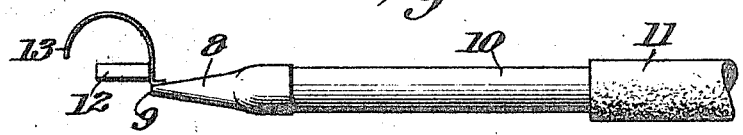
Figure 7:
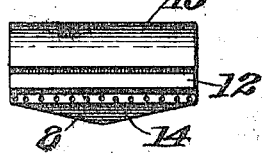
Figure 6:
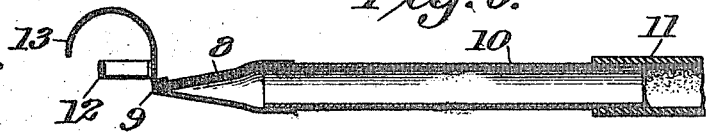

In the accompanying drawings illustrating the invention, in the several figures of which like parts are similarly designated, Figure 1 is a perspective view showing one arrangement of the apparatus for use. Fig. 2 is a top plan view of the scrubber, and Fig. 3 is a bottom plan view of one end thereof; Fig. 4 is a side elevation and Fig. 5 is an end elevation thereof; Fig. 6 is a longitudinal section, but showing a perforated instead of a continuous discharge end, and Fig. 7 is an end elevation of the modified form of Fig. 6.

The pan or support 1 is of any suitable shape to conveniently receive and support a diaper to be cleaned or washed and to be inserted in and supported by the receptacle into which the fecal matter is to be discharged. One convenient form is shown in Fig. 1, same being that of a truncated wedge, having upstanding flanges 2 on its longer sides and a similar flange 3 at its wider end, while its narrower and discharge end 4 is open and preferably provided with a cross-piece 5 applied to the upper portions of the side flanges 2, to arrest the movement of the scrubber hereinafter described. This cross-piece may be of wire, and is here so shown. The pan is so proportioned that its open end will be balanced in the receptacle, as illustrated in Fig. 1, in connection with a flushing-tank water-closet bowl 6, so as to be readily held in place when in use. The pan may be provided with a clip or clips 7 at its wider end to engage the diaper; but, of course, any suitable retaining means may be used, or none at all, since the hand that engages the pan may also be used to retain the diaper.

The flanges constitute a rim for the pan and not only strengthen it, but also prevent slop-over.

The scrubber comprises a hollow head 8 of wedge form and having a relatively wide and narrow mouth or discharge end 9, and a hollow handle 10 to which may be applied a flexible tube 11 which is to be connected with a water supply, such as a faucet, to supply water to the head while the garment is being cleaned. The head has a scraper 12 applied to it in advance of the mouth 9 and above it, to loosen the fecal matter and thus free it for the discharging action of the water ejected thereupon by the scrubber. Over this scraper and the mouth is an overhanging shield 13 extending in advance of the scraper.

Instead of having the mouth as a continuous opening, extending unbrokenly across the head of the scrubber, and thereby delivering the water in a wide film, it may be partly closed by a perforated plate 14, Figs. 6 and 7, so as to divide the outflowing water into jets.

Should the scrubber escape from the hand of the user, or should it be desired to release it, the cross-piece 5 prevents its escape from the pan.

All of the parts of the pan and the scrubber preferably are made of non-corrosive and easily cleaned and disinfected material, such as non-corrosive metal, or other metal coated or otherwise supplied with non-corrosive material, or enameled, so as to avoid disfiguring or otherwise injuring the garments and also to preserve their sanitary quality. It is to be noted also that the pan and the scrubber are without recesses or angles that would be likely to harbor fecal matter or water when not in use, and that they may therefore be thoroughly cleansed after use. The edges of the scraper preferably are rounded so as to avoid scarring the garment and to facilitate use and cleansing.

The scraper may be made of any suitable material, rigid or flexible.

The operation is to arrange the soiled garment in the pan, and place the pan in a water-closet bowl or other vessel in sewer connection, or a pail, and connect the scrubber with a water supply and then pass the scrubber back and forth over the garment as often and with as much force as may be necessary to remove the fecal matter, the scraper serving to loosen and discharge the matter and the water ejected by the scrubber serving to wash away the matter and cleanse the garment. If the garment then is not quite clean and unstained, it may be washed in any ordinary way.

Variations in details of construction and arrangement of parts are contemplated as within the scope and principle of the invention claimed. The invention, moreover, is susceptible of use for other purposes than the one herein particularly mentioned.

What I claim is:—

1. Washing apparatus of the character described, comprising a support for the article undergoing treatment, and a scrubber of hollow construction adapted to be supplied with washing fluid and having a contracted mouth adapted to discharge the fluid over a considerable width, a scraper arranged in advance of the mouth and a shield overhanging the mouth and scraper.

2. Washing apparatus of the character described, comprising a support for the article undergoing treatment and a scrubber comprising a wedge-shaped hollow head having a hollow handle adapted to receive a water supplying agent, a laterally extended mouth, a scraper arranged in advance of the mouth and transversely of the head, and a shield rising above and extending over the mouth and scraper.

3. A scrubber comprising a hollow head having a laterally extended contracted mouth, a hollow handle adapted to be connected with a fluid supply, a scraper arranged on the head in advance of its mouth and above the same, and an upwardly and forwardly curved shield extending above and beyond the mouth and scraper.

4. A scrubber for washing apparatus, comprising a non-corrosive hollow head having a wide but contracted mouth, a hollow handle adapted to supply washing fluid to the head to be discharged through the mouth, a scraper arranged in advance of the mouth and extending crosswise of the head, and an overhanging shield.

In testimony whereof I have hereunto set my hand this 16th day of December, A. D. 1916.

HARVEY N. GILBERT.

Witnesses:
 GRACE E. HULQUIST,
 JACOB VETTER.